United States Patent [19]
Fujii et al.

[11] Patent Number: 4,845,595
[45] Date of Patent: Jul. 4, 1989

[54] METER DEVICE FOR VEHICLE

[75] Inventors: Toshihiro Fujii; Shunjiro Fukui, both of Okazaki, Japan

[73] Assignee: Mitsubishi Jidosha Kogyo Kabushiki Kaisha, Tokyo, Japan

[21] Appl. No.: 221,676

[22] Filed: Jul. 20, 1988

[30] Foreign Application Priority Data

Jul. 31, 1987 [JP] Japan .............................. 62-116785[U]
Jul. 31, 1987 [JP] Japan .............................. 62-116786[U]
Aug. 27, 1987 [JP] Japan .............................. 62-129122[U]

[51] Int. Cl.⁴ ............................................ G01D 11/28
[52] U.S. Cl. ...................................... 363/30; 362/23; 362/29; 116/DIG. 36
[58] Field of Search ............ 362/23, 26, 29, 30, 362/32; 116/DIG. 35, DIG. 36

[56] References Cited

U.S. PATENT DOCUMENTS 3,499,417  3/1970  Heinke .............................. 362/29 X
4,044,708  8/1977  Klein ................................. 362/29 X
4,625,262 11/1986  Sakakibara et al. ............. 362/30 X Primary Examiner—Stephen F. Husar
Attorney, Agent, or Firm—Abelman Frayne Rezac & Schwab

[57] ABSTRACT

A meter panel device for a vehicle having a light-transmissive base plate having a dial face and marking, and a light emitting unit, which comprises translucent colored layers differing in color from each other provided respectively on the front side and backside of the dial face, and translucent colored layers differing in color from each other provided respectively on the front side and backside of the marking, thus enabling changes in colors of the dial face and the marking between the daytime in which the vehicle interior is relatively lighter than the backside of the meter device and the night in which the light emitting unit disposed at the rear side of the meter device is lit and the vehicle interior is relatively darker than the backside of the meter device.

6 Claims, 3 Drawing Sheets

METER DEVICE FOR VEHICLE

BACKGROUND OF THE INVENTION

This invention relates to a meter device for a vehicle which is suitable for use in vehicles such as automobiles.

Referring to FIG. 7, a prior art meter device 01 for a vehicle used in automobiles, which is illuminated from the backside and changes in color of letters and scale marks 02 (hereinafter referred to as "marking 02") between night and daytime. FIG. 8 is a sectional view of a dial plate of the prior art meter device 01. Referring to FIG. 8, a transparent base plate 04, based on such a material as polycarbonate sheet and having the marking 02 and a dial face 03, is printed on it at the locations corresponding to the marking 02 with translucent white layers 05 and on the portions of the dial face 03 other than the marking 02 with an opaque mask 06 of a contrasting color. These translucent white layers 05 and the contrastingly colored mask 06 are covered by a clear layer 07. On the other hand, portions corresponding to the marking 02 on the backside of the base plate 04 are printed with translucent green layers 08, and a translucent white layer 09 is provided on the backside of the base plate 04 corresponding to the translucent green layers 08 and the rest of the dial face 03.

With such a dial plate of the above arrangement, the dial face 03 looks colored and the marking 02 looks white in daytime but, at night, by lighting with a green lamp bulb 010 disposed at the rear side of the vehicle meter device 01, only the marking 02 allows green light to pass, and the dial face 03 looks black and the marking 02 looks green. The translucent white layer 09 provided on the backside of the base plate 04 is to diffuse the light from the lamp bulb 010.

FIG. 9 shows the structure of an indicator 011 used in such a vehicle meter device 01. As shown in FIG. 9, an indicator body 012 is made of a transparent material, which is provided on its lower surface with a colored hot stamp 013. Light from the lamp bulb 010 is collected by a light guide plate 014 to a rotational center 015 and, by a reflecting light source 016, is reflected in the longitudinal direction of the indicator body 012. The reflected light is scattered by the hot stamp 013 provided on the lower surface of the indicator body 012, whereby the indicator body 012 emits light. Since the indicator body 012, as shown in FIG. 10, has a trapezoidal cross section, light diffused by the hot stamp 013 is transmitted mostly from an upper surface 017, formed wider, of the indicator body 012, thereby improving the visibility of the indicator 011.

However, as described above, the prior art meter 01 changes only the color of its marking 02 between day and night, and the marking lights green in the night, and is not attractive in appearance.

Moreover, in the twilight time, when the dial face 03 is light in color, illuminated marking 02 looks blurred and is hard to read because of an insufficient contrast.

Further, with the above described indicator 011, light beams 020 and 021 coming through slanted sides 018 and 019 of the trapezoidally-sectioned indicator 011 illuminate areas 022 and 023 around the indicator of the dial face 03 which, especially when the dial face 03 is of light color, causes halation on the dial surface and makes the indicator 011 hard to be read.

SUMMARY OF THE INVENTION

With a view to obviate the prior art defects of meter devices for a vehicle, it is a first object of the present invention to provide a meter device for a vehicle which changes the colors of both the marking and the dial face between day and night, to provide an attractive appearance. It is a second object of the present invention to provide a meter device for a vehicle which, even one with a white dial face, enables easy-to-read marking, even in the twilight time. Further, it is a third object of the present invention to provide a meter device for a vehicle which, even one with a white dial face, has an indicator with high readability.

In accordance with the present invention which attains the above first object, there is provided a meter panel device for a vehicle having a light-transmissive base plate having a dial face and marking, and a light emitting unit disposed in a space at the rear side of the base plate, comprising a first translucent colored layer provided on a portion of the backside of the base plate corresponding to the dial face, a second translucent colored layer differing in color from the first translucent colored layer provided on a portion of the backside of the base plate corresponding to the marking, a third translucent colored layer differing in color from the first translucent colored layer provided on a portion of the front side of the base plate corresponding to the dial face, and a fourth translucent colored layer differing in color from the second translucent colored layer provided on a portion of the front side of the base plate corresponding to the marking.

The meter device of the above arrangement exhibits, in the daytime, a color combination of a third and fourth translucent color layers on the front side and, in the night, by the illumination from the backside, exhibits relief colors of the first and second translucent colored layers on the backside of the base plate coming up with the colors of the third and fourth translucent colored layers on the front side of the base plate.

There is further provided according to the present invention which attains the above second object a meter panel device for a vehicle having a light-transmissive base plate having a dial face and marking, and a light emitting unit disposed in a space at the backside of the base plate, comprising a first translucent colored layer provided on a portion of the backside of the base plate corresponding to the dial face, a second translucent colored layer differing in color from the first translucent colored layer provided on a portion of the backside of the base plate corresponding to the marking, a third translucent colored layer differing in color from the first translucent colored layer provided on a portion of the front side of the base plate corresponding to the dial face, a fourth translucent colored layer differing in color from the second translucent colored layer provided on a portion of the front side of the base plate corresponding to the marking, and an opaque layer provided at boundaries between the third translucent colored layer and the fourth translucent colored layer.

The meter of the above arrangement exhibits, in the daytime and night, the same color changes as the first meter panel device described above but, in the twilight time, even when the third translucent colored layer is white, provides a sharp contrast of the boundaries between the third and fourth translucent colored layers by the function of the opaque layer.

There is further provided according to the present invention which attains the above third object a meter panel device for a vehicle comprising a light-transmissive base plate having a dial face and marking, a light emitting unit disposed in a space at the backside of the base plate, a translucent colored layer provided on a portion of the backside of the base plate corresponding to the dial face or the marking, another translucent colored layer differing in color from the translucent colored layer provided on a portion of the backside of the base plate corresponding to the translucent colored layer, and an indicator comprising a light-transmissive material, moving nearly along the surface of the base plate, and transmitting light from the light emitting unit, the indicator being formed to have a rectanguluar cross section along the width direction of the indicator and to have a pair of opposing side surfaces perpendicular to the base plate.

In the meter device with the above arrangement, even if light passing in the longitudinal direction of the indicator leaks out of the side surfaces of the indicator, the leaked light advances parallel to the base plate since the side surfaces are formed perpendicular to the base plate.

DETAILED DESCRIPTION OF PREFERRED EMBODIMENTS

Figure 1:
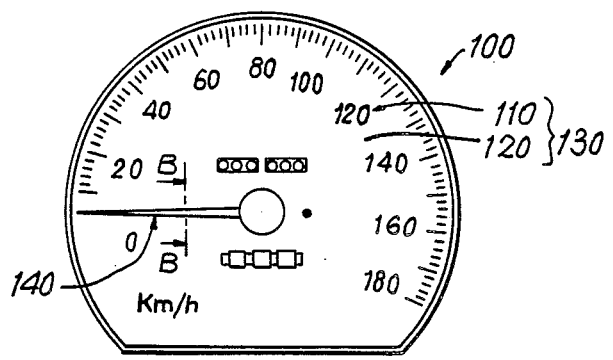
FIG. 1 is a schematic view showing an embodiment of the meter device for a vehicle according to the present invention.

FIG. 1 is a schematic view showing an embodiment of the vehicle meter device according to the present invention. Referring to FIG. 1, a vehicle meter device 100 comprises a dial plate 130 having a marking 110 and a dial face 120, an indicator 140 rotatably driven along the dial plate 130, and a light emitting unit (not shown) disposed in a space at the backside of the dial plate 130, which illuminates at least one of the marking 110 and the dial face 120, and the indicator 140 from the backside.

Figure 2:
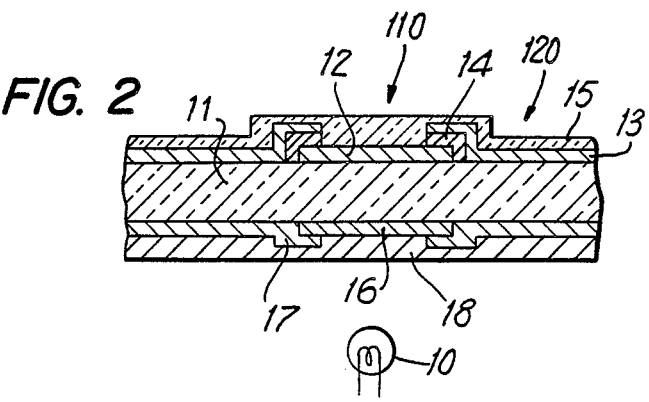
FIG. 2 to FIG. 4 are schematic sectional views showing embodiments of dial plate.

A preferred embodiment of the dial plate 130 will now be described. FIG. 2 is a sectional view showing an embodiment of the dial plate according to the present invention. Referring to FIG. 2, the surface of a base plate 11 based on transparent polycarbonate is provided by printing, for example, on its surface, on the portion corresponding to the marking 110 which is letters and scale marks, with a translucent white layer 12 and, on the portion corresponding to the rest of the dial face 120, with a translucent black layer 13. In this embodiment, an opaque black layer 14 which does not allow light to pass is provided at boundaries between the translucent white layer 12 and the translucent black layer 13. The opaque black layer 14 can be provided as needed. A clear layer 15 as a protective film is provided on the the translucent white layer 12 and the translucent black layer 13.

The portion of the backside of the base plate 11 corresponding to the marking 110 is provided by printing with a translucent green layer 16 and the other portion corresponding to the dial face 120 is provided with a translucent dark-blue layer 17. Further, a translucent white layer 18 is provided on these translucent green layer 16 and translucent dark-blue layer 17.

The translucent colored layers 12, 13, 16, and 17 can be based, for example, on the following composition.

| | |
|---|---|
| Coloring pigment (incl. extenders) | 10.0–35.0 |
| Vinyl chloride - acrylic resin | 20.0–30.0 |
| Ketone solvent | 40.0–50.0 |
| Aromatic hydrocarbon solvent | 3.0–5.0 |
| Auxiliaries | 3.0–5.0 |
| | 100.0 (%) |

These translucent colored layers 12, 13, 16, and 17 are all capable of transmitting light, but the translucent colored layers 12 and 13 used on the front side are preferably to be those which are able to hide at least the colors of the translucent colored layers 16 and 17 provided on the backside.

The above-described first embodiment of the dial plate exhibits, in the daytime, the marking 110 in white and the dial face 120 in black and, in the night, by the illumination with the green lamp bulb 10, the marking 110 in green and the dial face 120 in dark blue.

The lamp bulb 10 as a light emitting unit is turned on and off in conjunction with other lamps provided on the vehicle.

Figure 3:
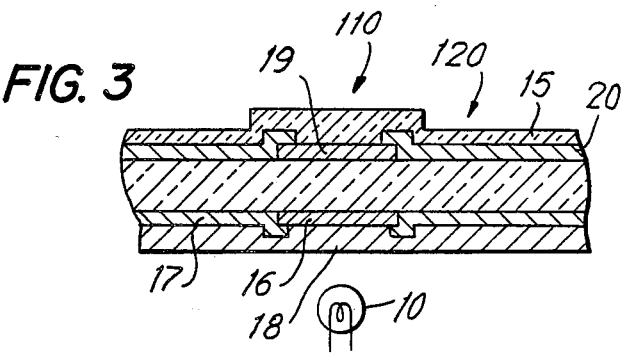

FIG. 3 is a schematic sectional view of a second embodiment of the vehicle meter device according to the present invention. In the figure, the same parts as used in the first embodiment are indicated with the same reference numbers and the same description will be omitted.

Referring to FIG. 3, the second embodiment is same as the first embodiment except that the portion of the front side of the base plate 11 corresponding to the marking 110 is provided with a translucent black layer 19, and the portion of the front side corresponding to the dial face 120 is provided with a translucent white layer 20. These translucent black layer 19 and translucent white layer 20 are able, in the daytime, to hide the colors of the translucent colored layers 16 and 17 on the backside and, in the night, to clearly exhibit the colors of the translucent colored layers 16 and 17 by the light transmitted from the lamp bulb 10. The dial plate of this embodiment exhibits, in the daytime, the marking 110 in black and the dial face 120 in white and, in the night, the marking 110 in green and the dial face 120 in dark blue.

Figure 4:
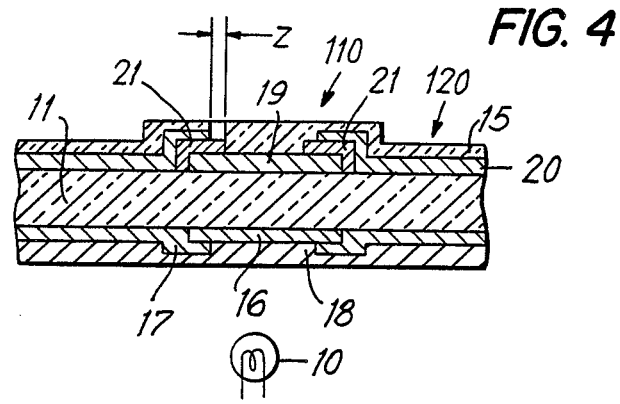

FIG. 4 is a schematic sectional view of a third embodiment of the dial plate according to the present invention. In the figure, the same parts as used in the above first and second embodiments are indicated with the same reference number and the same description will be omitted.

Referring to FIG. 4, in this embodiment, an opaque black layer 21 as an opaque colored layer is provided at the boundary between the translucent black layer 19 and the translucent white layer 20. More specifically, the opaque black layer 21 is provided as a band on the outer periphery of the translucent black layer 19. On the opaque black layer 21 is overlapped the translucent white layer 20 except a portion Z of 0.2 to 0.3 mm in width at the inside of the opaque black layer 21. Method for the formation of the opaque black layer 21 is not specifically restricted, but any method may be used which can form the contour of the marking 110. A clear layer 15 is provided as a protective film on the translucent black layer 19 and the translucent white layer 20.

The third embodiment of the dial plate described above exhibits, in the daytime, the marking 110 in black and the dial face 120 in white and, in the night, by the illumination of the green bulb 10, the marking in green and the dial face 120 in dark blue. In the twilight time even with the illumination lit, the marking 110 can be clearly distinguished from the white dial face 120 by the function of the opaque black layer 21 which forms the contour of the marking 110.

Figure 5:
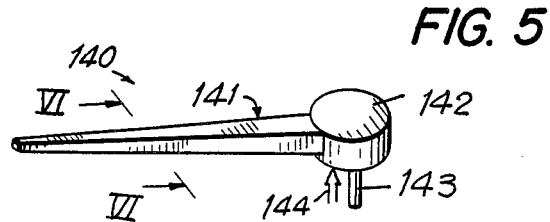
FIG. 5 and FIG. 6 are a schematic view showing an embodiment of indicator and its sectional view taken along the line VI—VI.
Figure 6:
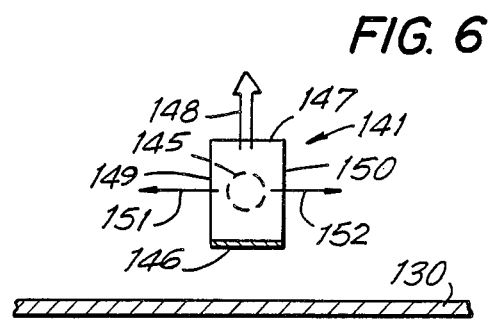
Figure 7:
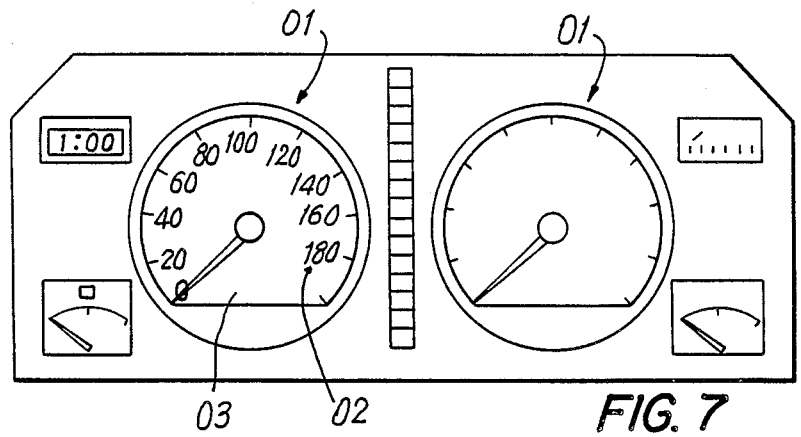
FIG. 7 is a schematic view showing a prior art meter device for vehicle.

A preferred embodiment of the indicator 140 will now be described. FIG. 5 is a schematic outer view of the embodiment of the indicator 140 and FIG. 6 is its schematic sectional view taken along the line VI—VI. Referring to the figures, the indicator 140 comprises an indicator body 141 made of a light-transmissive material and a rotational center 142 made of an opaque material, and is driven by a drive shaft 143 attached to the rotational center 142 to be rotationally moved to a specified position. The indicator 140, as shown in the description of the prior art, receives a light 144 from the light emitting unit disposed at the backside of the rotational center 142, directly or through a light guide plate made of a light-transmissive material such as acrylic resin, and the received light 144 is conducted by a reflector disposed in the interior of the rotational center 142 in the longitudinal direction of the indicator body 141. The light 144 thus conducted by a reflector 145 in the interior of the rotational center 142 is emitted from the indicator body 141 as it is passing through the indicator body 141. Specifically, by the function of a hot stamp 146 provided on the lower surface, a greater amount of light 148 is emitted from an upper surface 147, thereby improving the visibility of the indicator 140.

Specifically, in this embodiment, as shown in FIG. 6, the indicator 140 is formed to have a rectangular cross section, and side surfaces 149 and 150 of the indicator body 141 are perpendicular to a dial plate 130. Thus, lights 151 and 152 coming through the side surfaces 149 and 150 of the indicator body 141 advance in directions substantially parallel to the surface of the dial face 130.

By virtue of the above configuration and function of this embodiment of the indicator 140, if light conducted in the longitudinal direction of the indicator body 141 comes through the side surfaces 149 and 150 of the indicator body 141 which are perpendicular to the surface of the dial plate 130, the light advances in the direction parallel to the dial face 120 and thus does not light the dial face 120, especially near the indicator 140.

Therefore, occurrence of halation, which deteriorates the visibility of the indicator and was a prior art problem, is prevented, thereby improving the visibility of the indicator.

Figure 8:
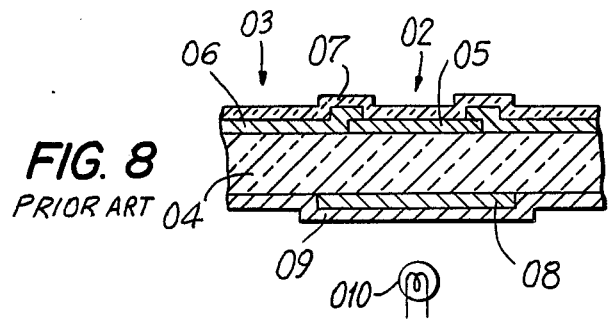
FIG. 8 is a schematic sectional view showing a prior art dial plate.
Figure 9:
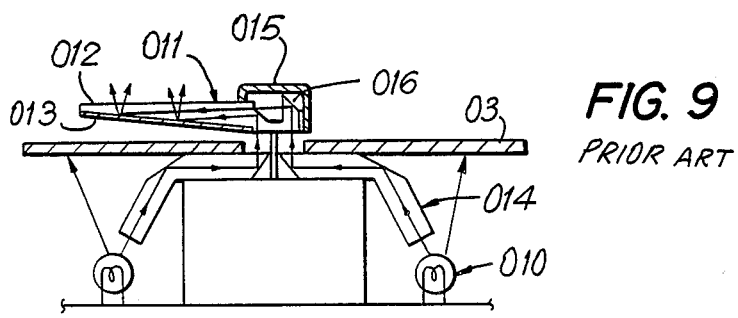
FIG. 9 and FIG. 10 are schematic sectional views showing prior art indicators.
Figure 10:
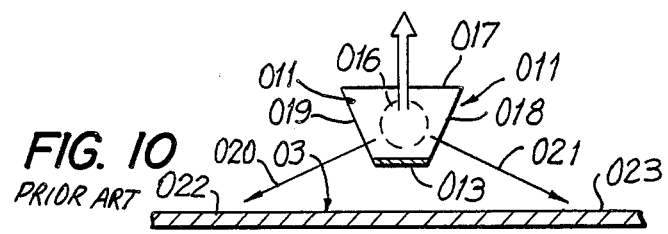

The indicator of this embodiment is preferably used with the above-described dial plates, but can also be used with a dial plate as shown in FIG. 8 which is of the same configuration as the prior art dial plate, in which only one of the marking and the dial face is light-transmissive through a translucent colored layer. Further, the indicator of this embodiment is especially useful since it since it does not cause halation even when used with a white dial face.

What is claimed is:

1. A meter device for a vehicle having a light-transmissive base plate having a dial face and marking, and a light emitting unit disposed in a space at the rear side of said base plate, comprising a first translucent colored layer provided on a portion of the backside of said base plate corresponding to said dial face, a second translucent colored layer differing in color from said first translucent colored layer provided on a portion of the backside of said base plate corresponding to said marking, a third translucent colored layer differing in color from said first translucent colored layer provided on a portion of the front side of said base plate corresponding to said dial face, and a fourth translucent colored layer differing in color from said second translucent colored layer provided on a portion of the front side of said base plate corresponding to said marking.

2. A meter device for a vehicle as claimed in claim 1, wherein said light emitting unit is a lamp bulb capable of being turned on and off in conjunction with other lamps disposed on said vehicle.

3. A meter device for a vehicle having a light-transmissive base plate having a dial face and marking, and a light emitting unit disposed in a space at the backside of said base plate, comprising a first translucent colored layer provided on a portion of the backside of said base plate corresponding to said dial face, a second translucent colored layer differing in color from said first translucent colored layer provided on a portion of the backside of said base plate corresponding to said marking, a third translucent colored layer differing in color from said first translucent colored layer provided on a portion of the front side of said base plate corresponding to said dial face, a fourth translucent colored layer differing in color from said second translucent colored layer provided on a portion of the front side of said base plate corresponding to said marking, and an opaque layer provided at boundaries between said third translucent colored layer and said fourth translucent colored layer.

4. A meter device for a vehicle as claimed in claim 3, wherein said light emitting unit is a lamp bulb capable of being turned on and off in conjunction with other lamps disposed on said vehicle.

5. A meter device for a vehicle as claimed in claim 3, wherein part of said opaque layer and periphery of said fourth translucent colored layer are overlapped.

6. A meter device for a vehicle comprising a light-transmissive base plate having a dial face and marking, a light emitting unit disposed in a space at the backside of said base plate, a translucent colored layer provided on a portion of the backside of said base plate corresponding to said dial face or said marking, another translucent colored layer differing in color from said translucent colored layer provided on a portion of the backside of said base plate corresponding to said translucent colored layer, and an indicator comprising a light-transmissive material, moving nearly along the surface of said base plate, and transmitting light from said light emitting unit, said indicator being formed to have a rectangular cross section along the width direction of said indicator and to have a pair of opposing side surface perpendicular to said base plate.

* * * * *